United States Patent
Legallais et al.

(10) Patent No.: US 12,081,720 B2
(45) Date of Patent: Sep. 3, 2024

(54) DEVICES AND METHODS FOR GENERATING AND RENDERING IMMERSIVE VIDEO

(71) Applicant: InterDigital CE Patent Holdings, Paris (FR)

(72) Inventors: Yvon Legallais, Rennes (FR); Jean Le Roux, Rennes (FR); Charles Salmon-Legagneur, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 176 days.

(21) Appl. No.: 17/760,567

(22) PCT Filed: Sep. 7, 2020

(86) PCT No.: PCT/EP2020/074949
§ 371 (c)(1),
(2) Date: Mar. 15, 2022

(87) PCT Pub. No.: WO2021/052799
PCT Pub. Date: Mar. 25, 2021

(65) Prior Publication Data
US 2022/0256132 A1    Aug. 11, 2022

(30) Foreign Application Priority Data
Sep. 19, 2019  (EP) .................................... 19306128

(51) Int. Cl.
*H04N 13/117* (2018.01)
*H04N 13/161* (2018.01)
(Continued)

(52) U.S. Cl.
CPC ......... *H04N 13/117* (2018.05); *H04N 13/161* (2018.05); *H04N 13/31* (2018.05); *H04N 19/597* (2014.11)

(58) Field of Classification Search
CPC .... H04N 13/117; H04N 13/31; H04N 13/161; H04N 19/597
(Continued)

(56) References Cited

U.S. PATENT DOCUMENTS 9,485,487 B2   11/2016  Kroon
2018/0091791 A1  3/2018  Jiang et al.
(Continued)

FOREIGN PATENT DOCUMENTS

CN     107924589 A    4/2018
EP      3457688 A1    3/2019
(Continued)

OTHER PUBLICATIONS

Schwarz et al., "2D Video Coding of Volumetric Video", Institute of Electrical and Electronics Engineers, 2018 Picture Coding Symposium (PCS), San Francisco, California, USA, Jun. 24, 2018, 5 pages.
(Continued)

*Primary Examiner* — James E Springer
(74) *Attorney, Agent, or Firm* — CONDO ROCCIA KOPTIW LLP

(57) ABSTRACT

Immersive 3D video content includes a plurality of preferably overlapping cells, each cell representative of a volume in the content, wherein a cell providing both content corresponding to a virtual central camera in the cell and parallax information from virtual peripheral cameras around the centre position can be next to a cell providing only parallax information to be used with the content corresponding to the virtual central camera. A device for rendering immersive video, renders a viewpoint corresponding to a user's current position, tracks and predicts the user position, and if the user position moves to a cell with central camera content, retrieves the content and parallax information, and if the user position moves to a cell with only parallax information,
(Continued)

retrieves the parallax information and, if necessary, also the cell with the content. This arrangement can reduce bandwidth and storage for the immersive 3D video content.

15 Claims, 7 Drawing Sheets

(51) Int. Cl.
    *H04N 13/31*     (2018.01)
    *H04N 19/597*     (2014.01)

(58) Field of Classification Search
    USPC .......................................................... 348/51
    See application file for complete search history.

(56) References Cited

U.S. PATENT DOCUMENTS

| | | |
|---|---|---|
| 2018/0115769 A1 | 4/2018 | Salome et al. |
| 2018/0192044 A1 | 7/2018 | Wang et al. |
| 2018/0270464 A1 | 9/2018 | Harviainen et al. |
| 2020/0177861 A1 | 6/2020 | Yokoyama et al. |
| 2020/0250798 A1* | 8/2020 | Lasang ................... G06T 5/006 |
| 2020/0389640 A1* | 12/2020 | Lee ..................... H04N 13/194 |

FOREIGN PATENT DOCUMENTS

| | | |
|---|---|---|
| EP | 3474562 A1 | 4/2019 |
| WO | 2017/031386 A1 | 2/2017 |
| WO | WO 2018130491 A1 | 7/2018 |
| WO | WO 2018213131 A1 | 11/2018 |
| WO | WO 2019012067 A1 | 1/2019 |
| WO | WO 2019016158 A1 | 1/2019 |
| WO | WO 2019044188 A1 | 3/2019 |
| WO | WO 2019055389 A1 | 3/2019 |
| WO | 2019/068745 A1 | 4/2019 |
| WO | WO 2019110405 A1 | 6/2019 |
| WO | WO 2020013975 A1 | 1/2020 |

OTHER PUBLICATIONS

Anonymous, "Part 11: Wireless LAN Medium Access Control (MAC) and Physical Layer (PHY) Specifications", Institute of Electrical and Electronics Engineers, IEEE Standards Board, IEEE Standard 802.11-1997, Jun. 26, 1997, 459 pages.

* cited by examiner

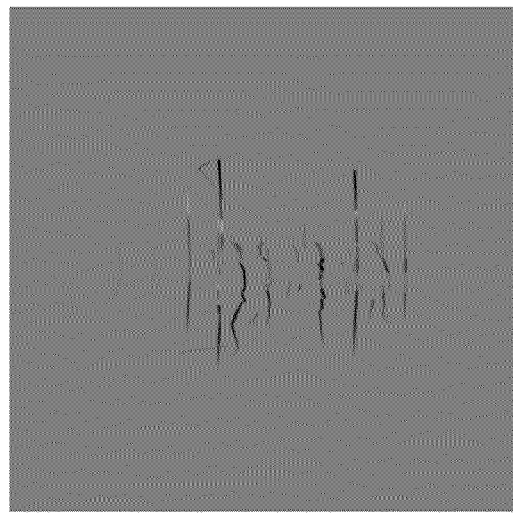
Figure 1A                    Figure 1B
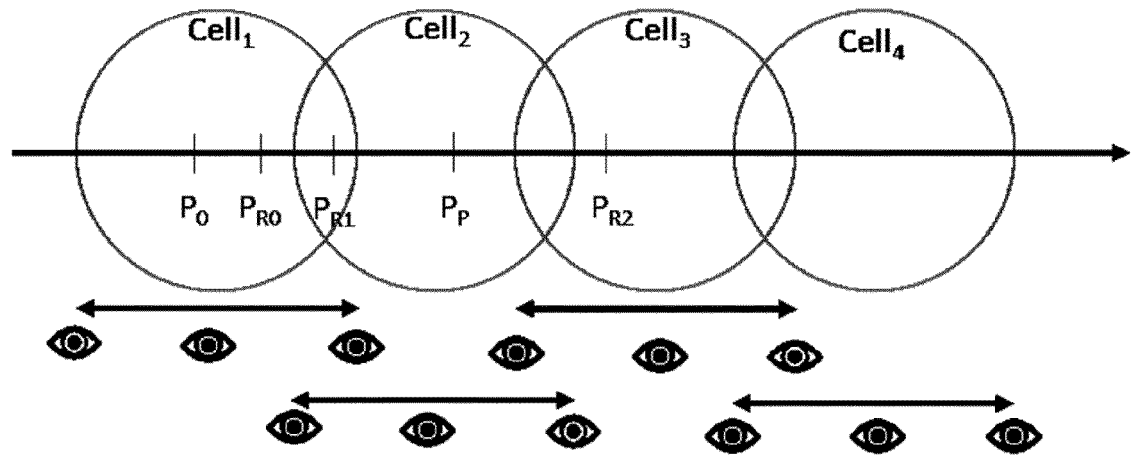
Figure 3

DEVICES AND METHODS FOR GENERATING AND RENDERING IMMERSIVE VIDEO

CROSS REFERENCE TO RELATED APPLICATIONS

This application is a U.S. National Stage Application under 35 U.S.C. 371 of International Patent Application No. PCT/EP2020/074949, filed Sep. 7, 2020, which is incorporated herein by reference in its entirety.

This application claims the benefit of European Patent Application No. 19306128, filed Sep. 19, 2019, which is incorporated herein by reference in its entirety.

TECHNICAL FIELD

The present document relates to three-dimensional (3D) scene and volumetric video content, in particular to encoding and/or formatting of the data representative of depth of a 3D scene.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Recently there has been a growth of available content with a large field of view (up to 360°). Such content is typically not fully visible by a user watching the content on immersive display devices such as Head Mounted Displays, smart glasses, PC screens, tablets, smartphones and the like. This means that at a given moment, a user may only be viewing a part of the content. However, a user can typically navigate within the content by various means such as head movement, mouse movement, touch screen, voice and the like.

Immersive video, also called 360° flat video, allows the user to watch in all directions by head rotation around a still point of view. However, rotations only allow a 3 Degrees of Freedom (3DoF) experience. 3DoF video may quickly become frustrating for the viewer who tends to expect more freedom, for example by experiencing parallax. In addition, 3DoF may also induce dizziness since, typically, pure head rotation is never used since the user also translates the head in up to three directions, translations which are not reproduced in 3DoF video experiences.

WO2018130491, WO2019016158, WO2019110405, WO2019012067 and WO2019055389 present an enhanced solution called 3DoF+ that, like 3oD, is based on a single viewpoint and offers limited translational user movement owing to the provision of parallax information related to a number of additional peripheral viewpoints around the central viewpoint. This gives the user the impression of being immersed in a small spherical area (or "cell").

Volumetric video (also known as 6 Degrees of Freedom (6DoF) video) is a further alternative to 3DoF video. When watching a 6DoF video, in addition to rotations, head and even body translations are possible within the watched content, which enables experiencing parallax and volumes. Such 6DoF video considerably increases the feeling of immersion and the perception of the scene depth and can also prevent or at least reduce dizziness by providing consistent visual feedback during head and body translations. Volumetric content is created by the means of dedicated sensors allowing the simultaneous recording of colour and depth of the scene of interest. The use of a rig of colour cameras combined with photogrammetry techniques is a common way of recording.

The amount of data of conventional 3DoF+ and volumetric video content is important and requires large storage capacities as well as high bandwidth for transport.

It will thus be appreciated that there is a desire for a solution that addresses at least some of the shortcomings of VR and AR content transmission and consumption. The present principles provide such a solution.

SUMMARY OF DISCLOSURE

In a first aspect, the present principles are directed to a method of rendering immersive video content. A device renders, using received data, a first viewpoint corresponding to a first user position in the immersive video, wherein the received data comprises parallax information of a first cell that encompasses the first user position, an identifier of a neighbouring cell, and content of a central patch of the neighbouring cell, and wherein the first viewpoint is generated from the content of the central patch and the parallax information.

In a second aspect, the present principles are directed to a device for rendering immersive video content, the device comprising a processor configured to render, using received data, a first viewpoint corresponding to a first user position in the immersive video, wherein the received data comprises parallax information of a first cell that encompasses the first user position, an identifier of a neighbouring cell, and content of a central patch of the neighbouring cell, and wherein the first viewpoint is generated from the content of the central patch and the parallax information.

In a third aspect, the present principles are directed to a method for generating immersive video content, the method comprising receiving content captured by cameras corresponding to at least two neighbouring cells, a first cell with at least a centre camera and a peripheral camera and a second cell with at least one camera, generating, using content captured by the at least one peripheral camera, first parallax information relative to the content captured by the centre camera, generating, using content captured by the at least one camera in the second cell, second parallax information relative to the content captured by the centre camera, and generating first cell content comprising the content captured by the centre camera and the first parallax information and second cell content comprising the second parallax information and an identifier of the first cell.

In a fourth aspect, the present principles are directed to a device for generating immersive video content, the device comprising a processor configured to receive content captured by cameras corresponding to at least two neighbouring cells, a first cell with at least a centre camera and a peripheral camera and a second cell with at least one camera, generate, using content captured by the at least one peripheral camera, first parallax information relative to the content captured by the centre camera, generate, using content captured by the at least one camera in the second cell, second parallax information relative to the content captured by the centre camera, and an encoder configured to generate first cell content comprising the content captured by the centre camera and the first parallax information and second cell content comprising the second parallax information and an identifier of the first cell.

In a fifth aspect, the present principles are directed to a content server configured to provide immersive video content, the content server comprising memory storing immersive video content comprising parallax information of a first cell that encompasses a user position, an identifier of a neighbouring cell, and content of a central patch of the neighbouring cell, and a processor configured to provide, in response to requests from client devices, the parallax information, the identifier of a neighbouring cell, and the content of the central patch to enable the client devices to render a viewpoint in the first cell.

In a sixth aspect, the present principles are directed to a non-transitory computer readable medium storing program code instructions that, when executed by a processor, implement the steps of a method according to any embodiment of the first aspect.

In a seventh aspect, the present principles are directed to a non-transitory computer readable medium storing program code instructions that, when executed by a processor, implement the steps of a method according to any embodiment of the third aspect.

BRIEF DESCRIPTION OF DRAWINGS

Features of the present principles will now be described, by way of non-limiting example, with reference to the accompanying drawings, in which:

FIG. 1A illustrates an example of a central patch and FIG. 1B illustrates an example of a corresponding peripheral patch according to the present principles;

FIG. 3 illustrates user position prediction according to the present principles;

DESCRIPTION OF EMBODIMENTS

As described in the above patent applications, it is possible to aggregate multiple 3DoF+ cells with video in order to approach complete 6DoF video immersion. The 3DoF+ cells are juxtaposed and preferably overlapping to enable essentially seamless transmission between cells.

3DoF+ includes transmission of volumetric input information as a combination of colour and depth patches stored in corresponding colour and depth atlases. Each patch results from successive spherical 2D projections (also called mappings), typically EquiRectangular Projection (ERP), of a subpart of the original 3D scene. Basically, this decomposition peels (also called factorizes) the scene as: i) a central patch containing the part of the scene visible from a central viewpoint and ii) peripheral patches embedding parallax information visible from additional adjacent viewpoints positioned around the central viewpoint. The central and peripheral patches are defined by using four virtual (360°) cameras, that can be placed at each vertex of a tetrahedron, with the one virtual camera at the centre and the three other virtual cameras symmetrically around the centre camera. The central viewpoint corresponds to the view from the central camera. Complementary points not visible from the central viewpoint but seen by the other cameras provide input for peripheral patches. An example of a central patch is illustrated in FIG. 1A and an example of a corresponding peripheral patch is illustrated in FIG. 1B according to the present principles.

These peripheral patches are then packed into atlases that are encoded making use of, for example, legacy HEVC video codecs. For each patch, a set of additional metadata are provided by specifying information required to recover the volumetric scene accurately (position and size of the patch, and parameters of the projection). Consequently, the overall stream can be fully video-based and compatible with the existing video streaming pipelines. In 3DoF+, the central patch represents the major part of the content (such as at least 80%).

A first problem with such a solution is that the use of multiple 3DoF+ cells requires a big volume of data. A second problem is that seamless transition between cells can require correct prediction of the user's position to provide enough time for downloading the next cell. As the space covered by a conventional 3DoF+ cell is small (typically tens of centimeters in diameter) and as it typically is difficult to have such a precision in the users position prediction, especially when moving fast, the prediction can pose problems, as will be discussed further.

Figure 2:
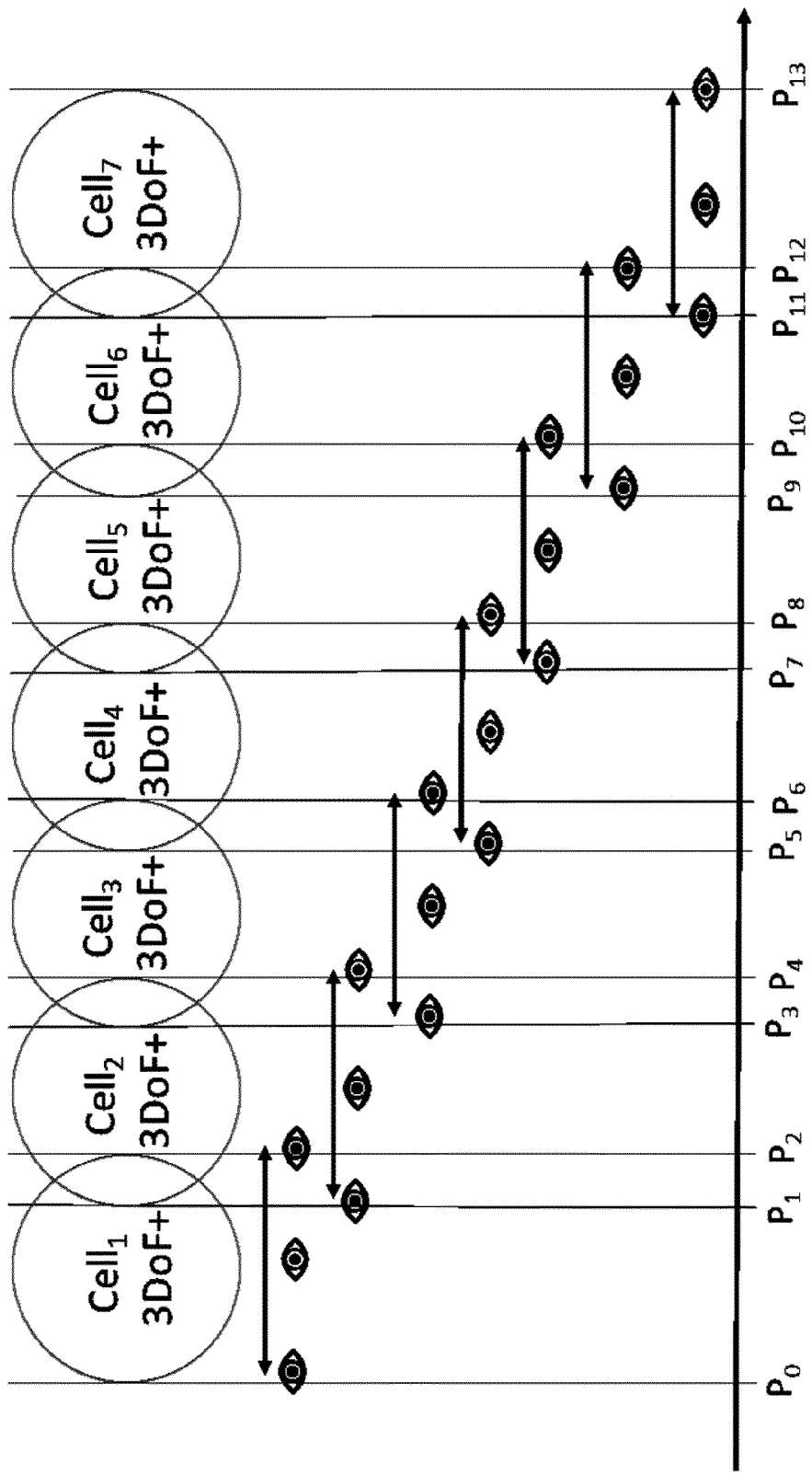
FIG. 2 illustrates an example of a set of neighbouring 3DoF+ cells according to the present principles.

FIG. 2 illustrates an example of a set of neighbouring 3DoF+ cells, the cells being denoted $Cell_1$ to $Cell_7$. In the example, the cells are aligned, essentially covering a rectangular area of I×L where I is the parallax width provided by a 3DoF+ representation and L is equal to 7×the parallax width provided by 3DoF+ cells minus overlapping areas. Conventional 3DoF+ cells have a limited size (e.g. 60 cm in diameter). Consequently, an immersive experience where the user can move within an area of a few square meters, can require tens of 3DoF+ cells which represents a huge quantity of data.

For the sake of illustration, consider rectilinear user movement from the left to the right. At the beginning, the user's viewpoint (i.e. user's position within the scene) is denoted $P_0$. Passing from point $P_0$ to point $P_{12}$ causes sequential consumption of a series of 3DoF+ cells that each provides video:

from $P_0$ to $P_1$: $Cell_1$
from $P_1$ to $P_2$: $Cell_1$ or $Cell_2$
from $P_2$ to $P_3$: $Cell_2$
from $P_3$ to $P_4$: $Cell_2$ or $Cell_3$
and so on.

In case of adaptive streaming delivery, before requesting a video chunk (also called segment), the client application predicts the user's position to determine when this content of the video chunk will be rendered.

FIG. 3 illustrates user position prediction according to the present principles. $P_0$ is the current user position, $P_P$ is the predicted user position and $P_{R0}$, $P_{R1}$ and $P_{R2}$ are 3 examples of real user positions at time of rendering the requested video chunk.

Position $P_P$ requires that $Cell_2$ has been acquired by the terminal. In the example of FIG. 2, if the user really is in position $P_{R2}$ while $P_P$ was forecast, $Cell_2$ has been downloaded while $Cell_3$ may not have been. In the same way, if the user is in position $P_{R0}$, the $Cell_1$ remains necessary. Note that position $P_{R1}$ is compliant with either $Cell_2$ or $Cell_1$. A first issue of the conventional method is that the future user's position prediction must be cell accurate, as already mentioned.

The present principles provide a scheme in which at least one 3DoF+ cell is 'extended' by a lighter so-called Patch Only (PO). Compared to the FIG. 1, such PO cells take the place of at least one 3DoF+ cell.

Figure 4:
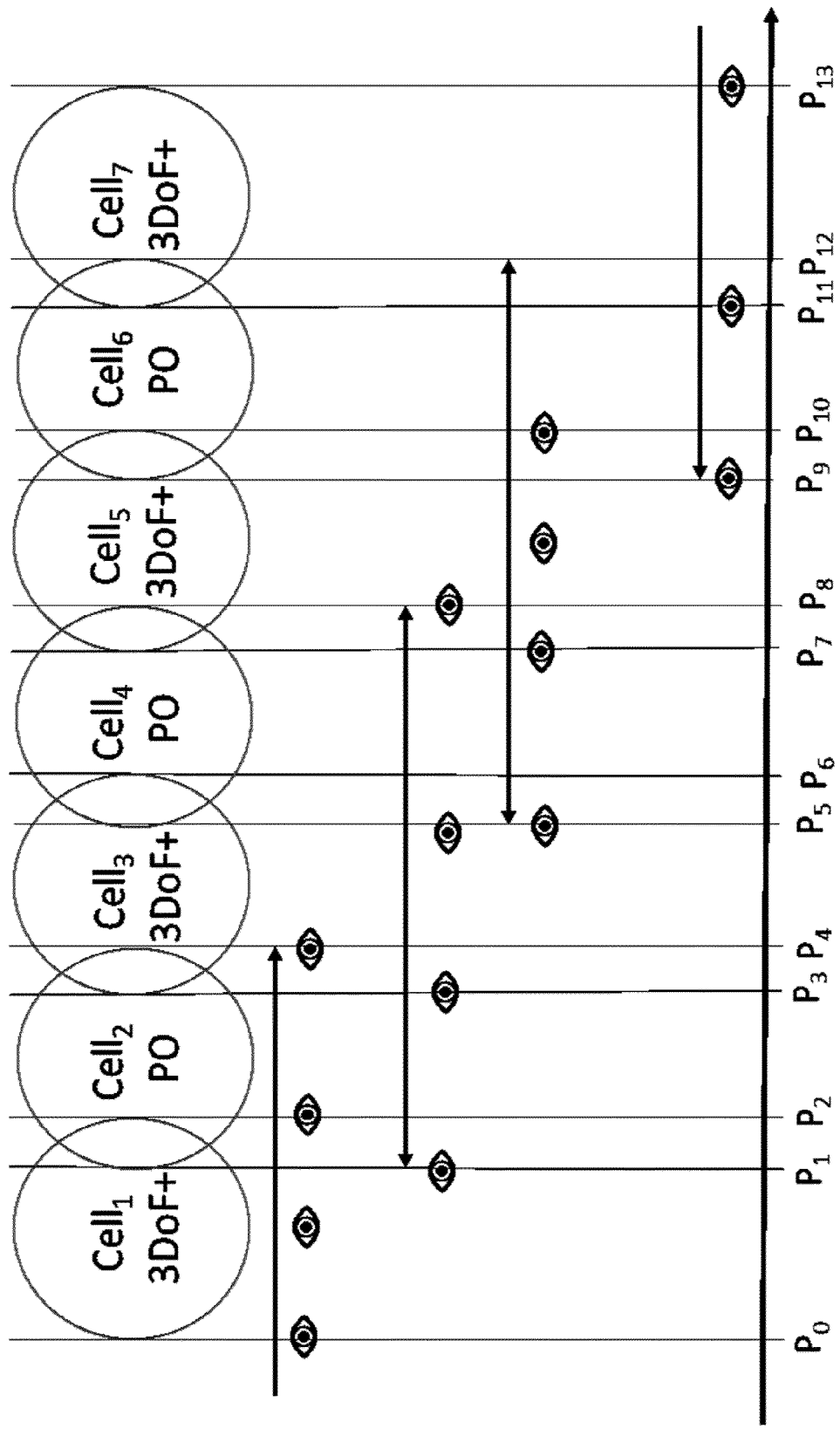
FIG. 4 illustrates an example of a set of cells according to the present principles.

FIG. 4 illustrates an example of a set of cells according to the present principles. In this example, compared to FIG. 1, every other 3DoF+ cell has been replaced by a PO cell. Using the positions of FIG. 1, rectilinear user movement from the left to the right starting at $P_0$ causes sequential consumption of a series of cells, 3DoF+ and PO, as follows:

from $P_0$ to $P_1$: 3DoF+ $Cell_1$ alone
from $P_1$ to $P_2$: 3DoF+ $Cell_1$, alone or extended by PO $Cell_2$, or 3DoF+ $Cell_3$ extended by PO $Cell_2$
from $P_2$ to $P_3$: 3DoF+ $Cell_1$ extended by PO $Cell_2$ or 3DoF+ $Cell_3$ extended by PO $Cell_2$
from $P_3$ to $P_4$: 3DoF+ $Cell_1$ extended by PO $Cell_2$ or 3DoF+ $Cell_3$, alone or extended by PO $Cell_2$
from $P_4$ to $P_5$: 3DoF+ $Cell_3$ alone
from $P_5$ to $P_6$: 3DoF+ $Cell_3$, alone or extended by PO $Cell_4$, or 3DoF+ $Cell_5$ extended by PO $Cell_4$
from $P_6$ to $P_7$: 3DoF+ $Cell_3$ extended by PO $Cell_4$ or 3DoF+ $Cell_5$ extended by PO $Cell_4$
from $P_7$ to $P_8$: 3DoF+ $Cell_3$ extended by PO $Cell_4$ or 3DoF+ $Cell_5$, alone or extended by PO $Cell_4$
and so on.

Or, putting it another way, 3DoF+ $Cell_3$ can be used from $P_1$ to $P_8$:
extended by PO $Cell_2$ from $P_1$ to $P_3$
alone or extended by PO $Cell_2$ from $P_3$ to $P_4$
alone from $P_4$ to $P_5$
alone or extended by PO $Cell_4$ from $P_5$ to $P_6$
extended by PO $Cell_4$ from $P_6$ to $P_8$.

As can be seen from the description of FIG. 4, according to the present principles, immersive content includes two different kinds of cells:

Conventional 3DoF+ cells that include content made using the conventional 3DoF+ content generation process and the default virtual camera positions: a central camera for central patch at centre position, and peripheral cameras around the centre position.

PO cells generated with differently positioned virtual cameras, as will be described in detail.

For the sake of clarity, the description of the generation of PO cells is (in most places) made with reference to three aligned cameras. This provides parallax along one direction only, i.e. as if the user was only authorized to move for example only left or right during a 3DoF+ experience. One skilled in the art will readily be able to extend the generation to more cameras in order to provide parallax along more directions.

As already mentioned, 3DoF+ content is in the conventional 3DoF+ format. An immersive scene made up of a plurality of 3DoF+ cells can be transformed into immersive content including 3DoF+ cells and PO cells, as will be described. The 3DoF+ cells include conventional 3DoF+ content, while the PO cells include parallax information that extends a neighbouring 3DoF+ cell and can be used when the user viewpoint is in an area where no central patch (of a 3DoF+ cell) is available. A PO cell includes the same kind of parallax information as a 3DoF+ cell for this area, but embeds peripheral patches complementary to different central patches issued from cameras positioned outside of the cell.

Figure 5:
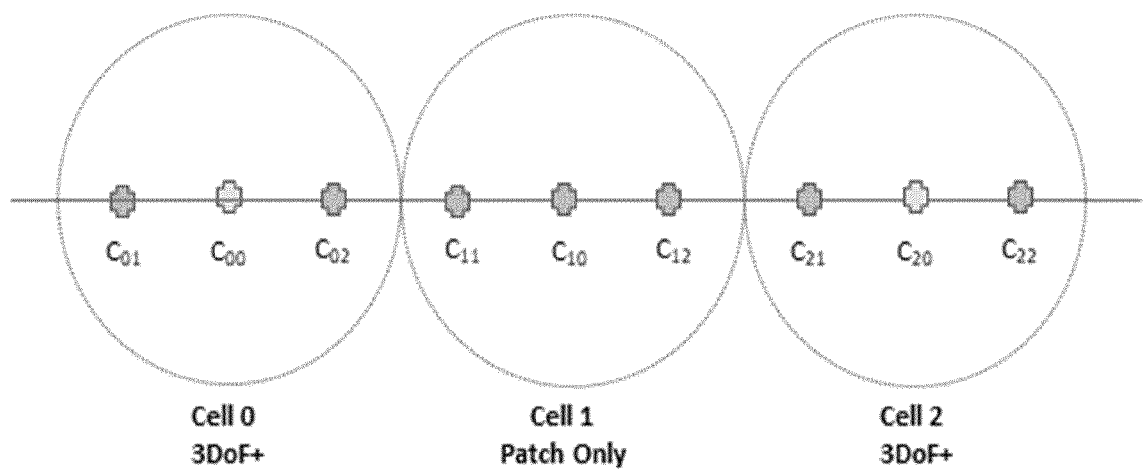
FIG. 5 illustrates an example of camera positions in three neighbouring cells according to the present principles.

FIG. 5 illustrates an example of camera positions in three neighbouring cells according to the present principles: Cell 0 and Cell 2 are conventional 3DoF+ cells, while Cell 1 is a PO cell. The three cells can be generated simultaneously.

In a first embodiment, the cameras $C_{10}$, $C_{11}$ and $C_{12}$ are respectively placed at centre and symmetrically around the centre of Cell 1. Like cameras $C_{01}$ and $C_{02}$ in Cell 0, cameras $C_{11}$, $C_{10}$ and $C_{12}$ can capture parts of the scene that are not visible at camera $C_{00}$ in the centre of the neighbouring 3DoF+ cell to the left. The depth and texture output of these cameras are used to generate parallax patches as if Cell 0 was extended to incorporate Cell 1.

However, other camera arrangements may be necessary to provide sufficient parallax information. For example, as shown in the embodiment in FIG. 6, more than three cameras can be used to generate a PO cell in order to lessen the difference from neighbouring 3DoF+ cells or in an attempt to cover all potential viewpoints within a cell. In particular, to avoid obstructed views of part of the scene, the distance between cameras can be limited.

Figure 7:
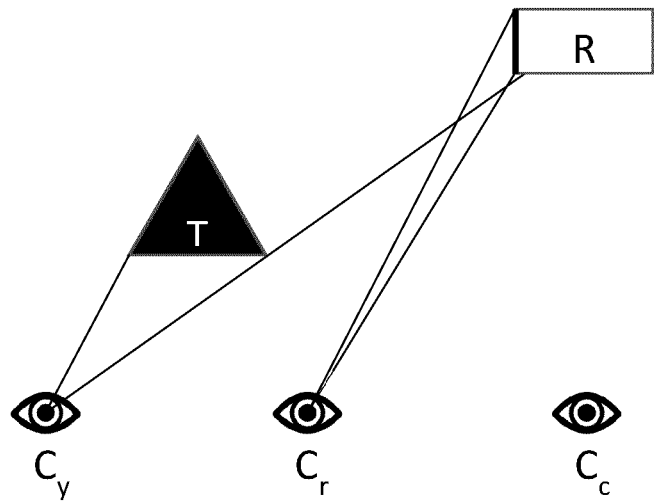
FIG. 7 illustrates a cell with a central camera and possible camera positions according to the present principles.

As illustrated in FIG. 7, $C_c$ is a central viewpoint, while $C_r$ and $C_y$ are potential positions for cameras positioned to its left. $C_y$ provides a larger amplitude for parallax, but does not allow capture of the left edge of object R, which on the other hand is visible from $C_r$. It can be necessary to use the two additional cameras ($C_y$ and $C_r$) to capture the elements of the scene as they would be seen by a user moving along an horizontal axis between the positions of $C_c$ and $C_y$.

The atlases of PO cells are not sufficient in themselves since they are complementary to a central patch of a neighbour 3DoF+ cell. In order to provide flexibility in the way the client application rebuilds a viewport in a PO cell, a PO cell may contain sets of patches to be combined with central patches of different neighbouring cells. In other words, using the capture of cameras of a PO cell, patches complementary to the central patch of the different neighbours are generated. For instance, in the example illustrated in FIG. 5, cameras $C_{11}$, $C_{10}$ and $C_{12}$ are used to generate, on one hand, patches with voxels not seen by camera $C_{00}$ and, on the other hand, patches with voxels which are not seen by camera $C_{20}$.

Figure 6:
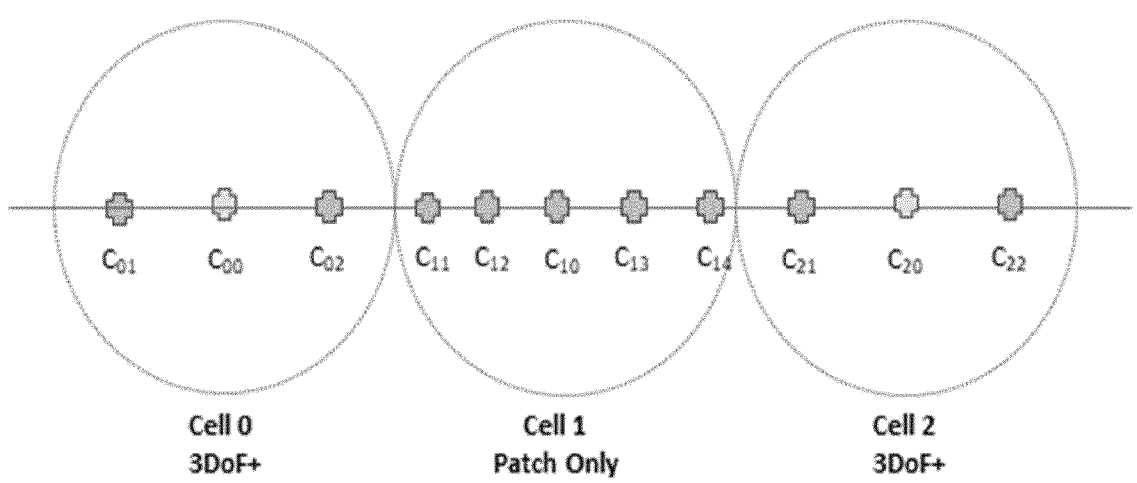
FIG. 6 illustrates another example of camera positions in three neighbouring cells according to the present principles.

In FIGS. 5 and 6, a single PO cell is found between two 3DoF+ cells. It should however be noted that other combinations of 3DoF+ and PO cells are possible; two PO cells may for example be inserted between two neighbour 3DoF+ cells.

Figure 8:
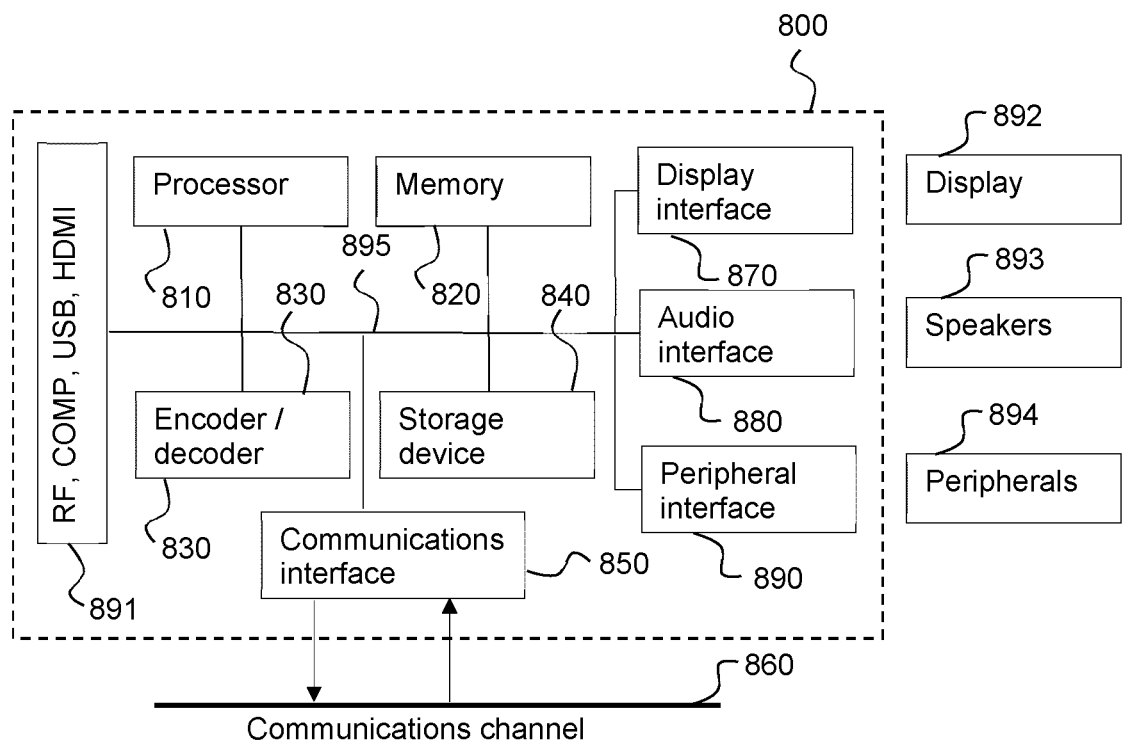
FIG. 8 illustrates a block diagram of an example of a system in which various aspects and embodiments of the present principles are implemented.

FIG. 8 illustrates a block diagram of an example of a system in which various aspects and embodiments of the present principles are implemented. System 800 can be embodied as a device including the various components described herein and is configured to perform one or more of the aspects of the present principles. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 800, alone or in combination, can be embodied in a single integrated circuit, multiple ICs, and/or discrete components. For example, in at least one embodiment, the processing and encoder/decoder elements of system 800 are distributed across multiple ICs and/or discrete components. In various embodiments, the system 800 is communicatively coupled to other similar systems, or to other electronic devices, via, for example, a communications bus or through dedicated input and/or output ports. In various embodiments, the system 800 is configured to implement one or more of the aspects described in this document.

The system 800 includes at least one processor 810 configured to execute instructions loaded therein for implementing, for example, the various aspects described in this document. Processor 810 can include embedded memory, input output interface, and various other circuitries as known in the art. The system 800 includes at least one memory 820 (e.g., a volatile memory device, and/or a non-volatile memory device). System 800 includes a storage device 840, which can include non-volatile memory and/or volatile memory, including, but not limited to, EEPROM, ROM, PROM, RAM, DRAM, SRAM, flash, magnetic disk drive, and/or optical disk drive. The storage device 840 can include an internal storage device, an attached storage device, and/or a network accessible storage device, as non-limiting examples.

System 800 includes an encoder/decoder module 830 configured, for example, to process data to provide an encoded video or decoded video, and the encoder/decoder module 830 can include its own processor and memory. The encoder/decoder module 830 represents module(s) that can be included in a device to perform the encoding and/or decoding functions. As is known, a device can include one or both of the encoding and decoding modules. Additionally, encoder/decoder module 830 can be implemented as a separate element of system 800 or can be incorporated within processor 810 as a combination of hardware and software as known to those skilled in the art.

Program code to be loaded onto processor 810 or encoder/decoder 830 to perform the various aspects described in this document can be stored in storage device 840 and subsequently loaded onto memory 820 for execution by processor 810. In accordance with various embodiments, one or more of processor 810, memory 820, storage device 840, and encoder/decoder module 830 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 810 and/or the encoder/decoder module 830 is used to store instructions and to provide working memory for processing that is needed during encoding or decoding.

In other embodiments, however, a memory external to the processing device (for example, the processing device can be either the processor 810 or the encoder/decoder module 830) is used for one or more of these functions. The external memory can be the memory 820 and/or the storage device 840, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 800 can be provided through various input devices as indicated in block 891. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 891 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 800 to other electronic devices across USB and/or HDMI connections. It is to be understood that various aspects of input processing, for example, Reed-Solomon error correction, can be implemented, for example, within a separate input processing IC or within processor 810 as necessary. Similarly, aspects of USB or HDMI interface processing can be implemented within separate interface ICs or within processor 810 as necessary. The demodulated, error corrected, and demultiplexed stream is provided to various processing elements, including, for example, processor 810, and encoder/decoder 830 operating in combination with the memory and storage elements to process the data stream as necessary for presentation on an output device.

Various elements of system 800 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 800 includes communication interface 850 that enables communication with other devices via communication channel 860. The communication interface 850 can include, but is not limited to, a transceiver configured to transmit and to receive data over communication channel 860. The communication interface 850 can include, but is not limited to, a modem or network card and the communication channel 860 can be implemented, for example, within a wired and/or a wireless medium.

Data is streamed to the system 800, in various embodiments, using a Wi-Fi network such as IEEE 802.11. The Wi-Fi signal of these embodiments is received over the communications channel 860 and the communications interface 850 which are adapted for Wi-Fi communications. The communications channel 860 of these embodiments is typically connected to an access point or router that provides access to outside networks including the Internet for allowing streaming applications and other over-the-top communications.

Other embodiments provide streamed data to the system 800 using a set-top box that delivers the data over the HDMI connection of the input block 891.

Still other embodiments provide streamed data to the system 800 using the RF connection of the input block 891.

The system 800 can provide an output signal to various output devices, including a display 892, speakers 893, and other peripheral devices 894. The other peripheral devices 894 include, in various examples of embodiments, one or more of a stand-alone DVR, a disk player, a stereo system, a lighting system, and other devices that provide a function based on the output of the system 800.

In various embodiments, control signals are communicated between the system 800 and the display 892, speakers 893, or other peripheral devices 894 using signaling such as AV.Link, CEC, or other communications protocols that enable device-to-device control with or without user intervention.

The output devices can be communicatively coupled to system 800 via dedicated connections through respective interfaces 870, 880, and 890.

Alternatively, the output devices can be connected to system 800 using the communications channel 860 via the communications interface 850. The display 892 and speakers 893 can be integrated in a single unit with the other components of system 800 in an electronic device such as, for example, a television.

In various embodiments, the display interface 870 includes a display driver, such as, for example, a timing controller (T Con) chip.

The display 892 and speaker 893 can alternatively be separate from one or more of the other components, for example, if the RF portion of input 891 is part of a separate set-top box. In various embodiments in which the display 892 and speakers 893 are external components, the output signal can be provided via dedicated output connections, including, for example, HDMI ports, USB ports, or COMP outputs.

Figure 9:
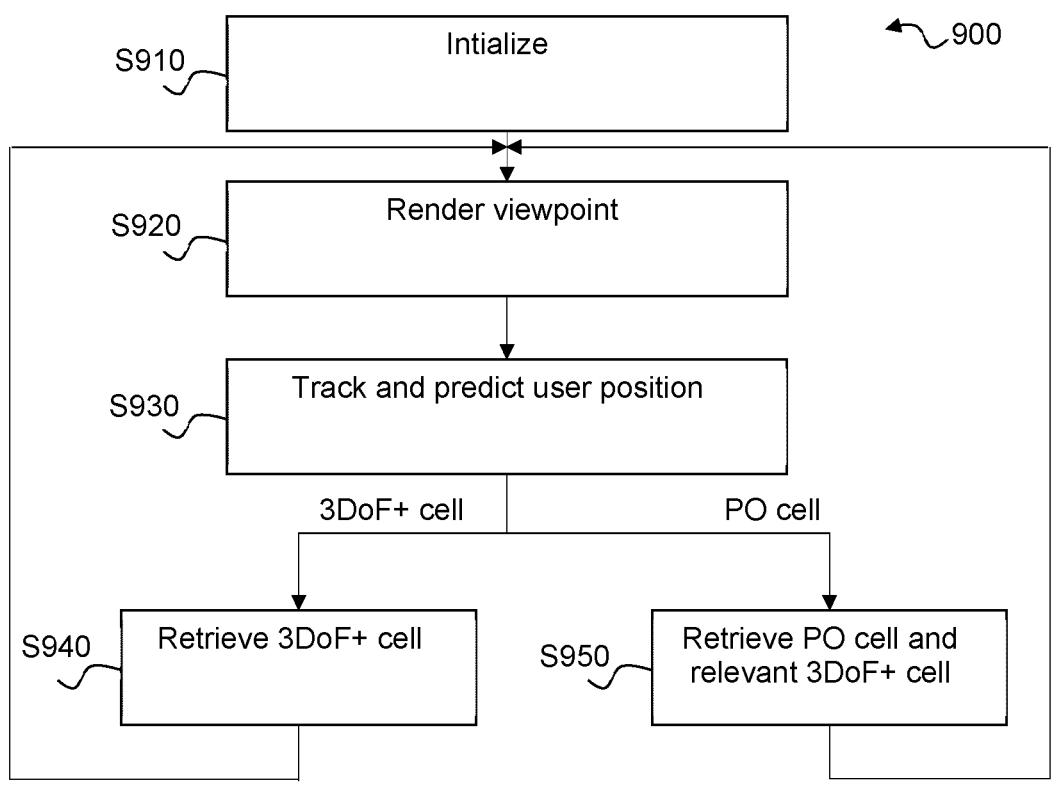
FIG. 9 illustrates a flowchart of a rendering method according to the present principles.

FIG. 9 illustrates a flowchart of a rendering method 900 according to the present principles. The method can be performed by a client device such as the system 800 in FIG. 8.

In step S910, the client device that is to render the immersive scene initialises using information, typically obtained from a manifest file, in order to retrieve the relevant video representation.

The information describes the user's navigation space, which can be a delimited surface, a predefined path, or a 3D space over or through which the user can move virtually using a game pad or physically while wearing a Head Mounted Display (HMD). The available navigation space is divided into different regions. Each of these regions corresponds to a cell that is to be used to get the volumetric data needed to render the viewport when the user is positioned inside. The cells can, but do not necessarily, overlap.

For each cell, the following information can be provided:
The area coverage of the cell in a suitable coordinate system, such as a global 3D cartesian coordinate system (e.g. a bounding box, a virtual sphere defined by centre position and radius, etc.)
The type of the cell: 3DoF+ cell or PO cell
For a 3DoF+ cell:
the location of the data of its central patch, such as the URI(s)
the location of the data of its peripheral patches, such as the URI(s)
For a PO cell: the atlases of the PO cell (i.e. the peripheral patches) and a composition array listing N ways of reconstructing a virtual 3DoF+ cell from the N neighbouring 3DoF+ cells
For each neighbouring 3DoF+ cell
the location of the data of its central patch, such as the URI(s)
the location of the data of the PO cell's peripheral patches relative to the neighbour 3DoF+ cell.
Video parameters such as for example codec and duration.
Parameters used to rebuild volumetric information from patches (e.g. packing information on patches, projection parameters of the cameras, and so on) can be provided to the device in the manifest (e.g. in the case of adaptive streaming) or as metadata in the stream.

In step S910, the client device builds the volumetric information of a retrieved cell in memory and renders the current user viewport.

During rendering of a multi-3DoF+ content, the client device retrieves 3DoF+ cells depending on the user's present and predicted position.

Figure 10A:
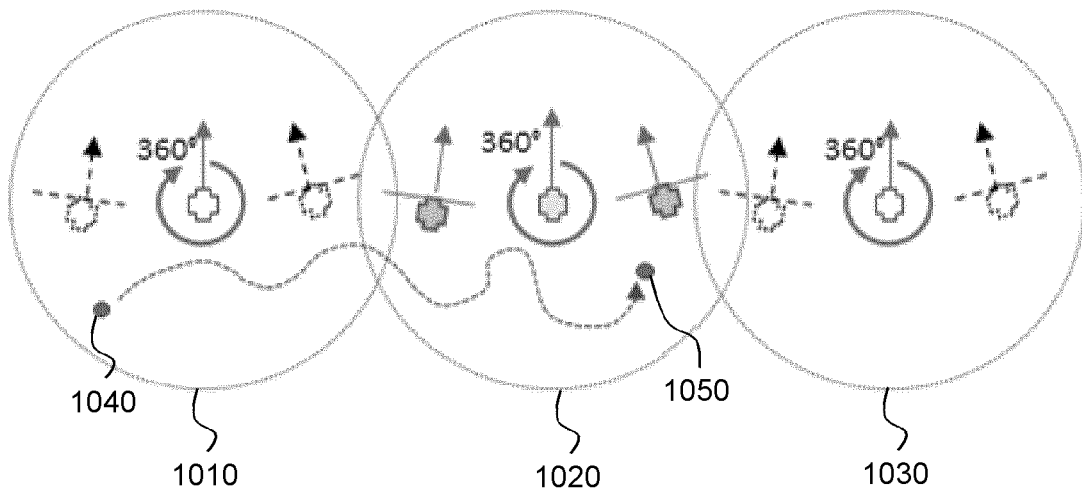
FIGS. 10A and 10B illustrate how, according to the present principles, content used for viewport rendering can depend not only on the current user position but also on the previous cell.
Figure 10B:
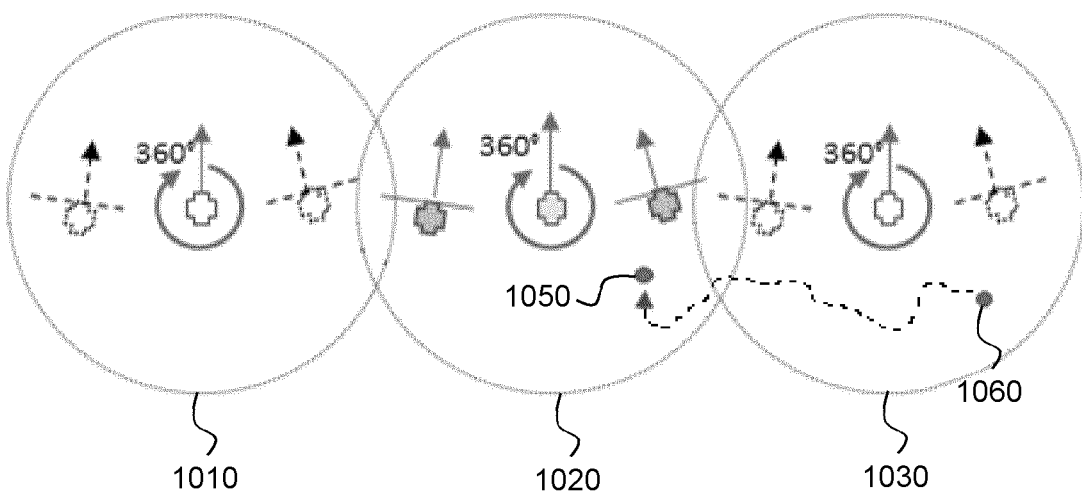

According to the present principles, however, the content used for viewport rendering can depend not only on the current position of the user but also on the previous cell. In the example depicted in FIGS. 10A and 10B, a user moves, in FIG. 10A, from the left to the right, starting from a first position 1040 in the left 3DoF+ cell 1010 to a second position 1050 in the middle 3DoF+ cell 1020, whereas the user moves, in FIG. 10B, from the right to the left, starting from a position 1060 in the right 3DoF+ cell 1030 to a second position 1050 in the middle 3DoF+ cell 1020. As can be seen, for a same end position 1050 within a PO cell 1020, the central patch is provided by either the left 3DoF+ cell 1010 (as in FIG. 10A) or the right 3DoF+ cell 1030 (as in FIG. 10B). For the PO cell in this example, the client device must be provided with, depending on which the previous cell was, access to at least the left or the right neighbouring central patches and to the respective associated patches.

The client device thus tracks the user's position within the grid of cells and predicts, in step S930, the position for a future time interval corresponding to the next video chunk to retrieve.

When the client device predicts, that the user enters a 3DoF+ cell, the client device retrieves, in step S940, the central and peripheral patches relative to this 3DoF+ cell, for example by obtaining their URIs from a manifest and requesting them from a content server. The content server includes at least one hardware processor, at least one communication interface and non-transitory storage (i.e. memory) configured to store immersive video content in the form of 3DoF+ cells and PO cells, which are provided to the client device, for example upon request.

When the client device predicts that the user enters a PO cell, the client device, in step S950, selects the most relevant 3DoF+ cell central patch and the peripheral patches of the PO cell relative to this neighbour 3DoF+ cell and obtains these, as the 3DoF+ cell previously.

Returning to the example of FIG. 3, when the user enters Cell$_2$, the client device has the choice between the central patches of Cell$_1$ and Cell$_3$. As can be seen, the area covered by a central patch is enlarged, which consequently can reduce the risks of downloading non-relevant content which would be bad for the user experience. For instance, if the user is moving slowly with a high probability (for instance only up to P$_{R1}$), it is preferable to select the central patch of Cell$_1$. On the other hand, if there is high probability that the user is accelerating, then it is preferable to obtain the central patch of Cell$_3$.

Examples of criteria of selection of central patches are:
Select the central patch whose centre point is closest to the predicted position, P$_E$.
Select the next chunk of the current central patch if user could come back to a previous point or could reduce his motion speed (suitable for P$_{R1}$).
Select the central patch of the next 3DoF+ cell after P$_P$ (suitable for P$_{R2}$).
Select the smaller central patch of Cell$_1$ and Cell$_3$, which can be interesting when bandwidth is reduced.

Upon reception of the central and peripheral patches (either 3DoF+ or PO), when it is time to render the cell, in step S920, the volumetric information is rebuilt into memory and rendered in the current user viewport, depending on the position and orientation of the user within the cell.

As can be seen, by expanding the area covered by a central patch the prediction of the future user's position can be much less constrained and by reducing the number of central patches the amount of data for the content can be reduced.

It will be appreciated that the present principles can reduce the quantity of 3DoF+ information for a 6DoF experience. This is due to the facts that the number of "full" 3DoF+ cells that is needed can be reduced—in at least some cases it can almost be halved—and that the substituting PO cells can be much smaller. Further, the present principles can be made compatible with 3DoF+ format standardized in MPEG OMAF. Further, the present principles can enable little or zero degradation of the user experience.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method of rendering immersive video content, the method comprising:
rendering by a device, using received cell data, a first viewpoint corresponding to a first user position in the immersive video, the first user position being in a first area covered by a first cell, the received cell data representing the first cell;
wherein the received cell data comprises parallax information of the first cell, an identifier of a neighboring cell covering a second area, and content of a central patch of the neighboring cell corresponding to the identifier, wherein the central patch comprises a part of a scene visible from a central viewpoint of the neighboring cell, wherein the first cell is a patch only (PO) cell for which the cell data is smaller than cell data of the neighboring cell; and
wherein the first viewpoint is generated from the content of the central patch and the parallax information.

2. A non-transitory computer readable medium storing program code instructions that, when executed by a processor, implement the steps of a method according to claim 1.

3. The method of claim 1, further comprising:
predicting, by the device, a second user position based on at least one tracked user position; and
retrieving, by the device, the parallax information of the first cell responsive to the second user position when the second user position indicates user movement from the tracked user position in the neighboring cell towards the first area.

4. The method of claim 1, wherein the first cell comprises the parallax information and the identifier of the neighboring cell, and the neighboring cell comprises the central patch.

5. The method of claim 4, wherein the first cell further comprises an identifier of a further neighboring cell adjacent to the first cell and further parallax information to be used with a central patch of the neighboring cell for generation of a viewpoint corresponding to a second user position in the immersive video.

6. A device for rendering immersive video content, the device comprising:
a processor configured to render, using received cell data, a first viewpoint corresponding to a first user position in the immersive video, the first user position being in a first area covered by a first cell, the received cell data representing the first cell;
wherein the received cell data comprises parallax information of the first cell, an identifier of a neighboring cell covering a second area, and content of a central patch of the neighboring cell, corresponding to the identifier, wherein the central patch comprises a part of a scene visible from a central viewpoint of the neighboring cell, wherein the first cell is a patch only (PO) cell for which the cell data is smaller than cell data of the neighboring cell; and
wherein the first viewpoint is generated from the content of the central patch and the parallax information.

7. The device of claim 6, wherein the processor is further configured to:
predict a second user position based on at least one tracked user position; and
retrieve the parallax information of the first cell responsive to the second user position when the second user position indicates user movement from the tracked user position in the neighboring cell towards the first area.

8. The device of claim 6, wherein the first cell comprises the parallax information and the identifier of the neighboring cell, and the neighboring cell comprises the central patch.

9. The device of claim 8, wherein the first cell further comprises an identifier of a further neighboring cell adjacent to the first cell and further parallax information to be used with a central patch of the neighboring cell for generation of a viewpoint corresponding to a second user position in the immersive video.

10. The device of claim 6, wherein the processor is configured to render the first viewpoint via a display interface of the device or on a display of the device.

11. The device of claim 6, further comprising a communications interface configured to receive the data.

12. A method for generating immersive video content, the method comprising:
receiving content captured by cameras corresponding to at least two neighboring cells covering different areas in the immersive video content, a first cell with at least a center camera and a peripheral camera, and a second cell with at least one camera;
generating, using content captured by the at least one peripheral camera, first parallax information relative to the content captured by the center camera;
generating, using content captured by the at least one camera in the second cell, second parallax information relative to the content captured by the center camera; and
generating first cell content comprising the content captured by the center camera and the first parallax information and second cell content comprising the second parallax information, wherein the second cell is a patch only (PO) cell for which the second cell content is smaller than the first cell content of the first cell, the second cell content further comprising an identifier of the first cell, thereby enabling a viewpoint of the second cell to be generated using the content captured by the center camera.

13. A non-transitory computer readable medium storing program code instructions that, when executed by a processor, implement the steps of a method according to claim 12.

14. A device for generating immersive video content, the device comprising:
a processor configured to:
receive content captured by cameras corresponding to at least two neighboring cells covering different areas in the immersive video content, a first cell with at least a center camera and a peripheral camera, and a second cell with at least one camera;
generate, using content captured by the at least one peripheral camera, first parallax information relative to the content captured by the center camera;
generate, using content captured by the at least one camera in the second cell, second parallax information relative to the content captured by the center camera; and
an encoder configured to generate first cell content comprising the content captured by the center camera and the first parallax information and second cell content comprising the second parallax information and an identifier of the first cell that enables a viewpoint of the second cell to be generated using the content captured by the center camera, wherein the second cell is a patch only (PO) cell for which the second cell content is smaller than the first cell content of the first cell.

15. A content server configured to provide immersive video content, the content server comprising:
memory storing immersive video content comprising, for a first cell, first cell content comprising parallax information of the first cell covering a first area that encompasses a user position, an identifier of a neighboring cell covering a second area in the immersive video content, and content of a central patch of the neighboring cell; and
a processor configured to provide, in response to requests from client devices, the parallax information, the identifier of a neighboring cell, and the content of the central patch to enable the client devices to render a viewpoint in the first cell, wherein the first cell is a patch only (PO) cell for which the first cell content is smaller than cell content of the neighboring cell.

* * * * *